UNITED STATES PATENT OFFICE.

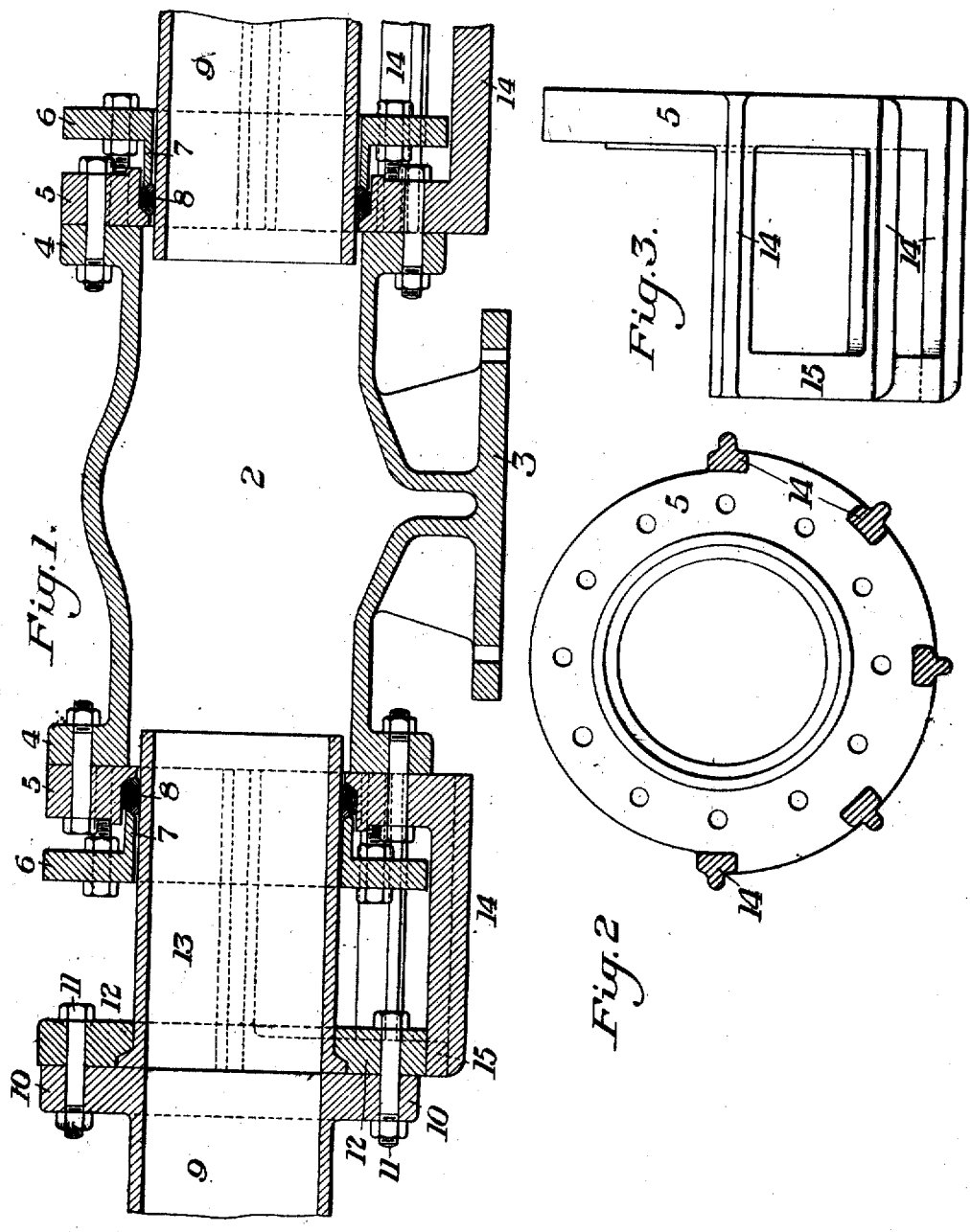

EDWARD B. TYLER, OF WILKINSBURG, PENNSYLVANIA.

PIPE CONNECTION.

1,006,317. Specification of Letters Patent. Patented Oct. 17, 1911.

Application filed March 22, 1911. Serial No. 616,146.

*To all whom it may concern:*

Be it known that I, EDWARD B. TYLER, of Wilkinsburg, Allegheny county, Pennsylvania, have invented a new and useful Pipe Connection, of which the following is a full, clear, and exact description, reference being had to the accompanying drawings, forming part of this specification, in which—

Figure 1 is a longitudinal section illustrating one form of my invention; Fig. 2 is a sectional elevation showing the supporting device removed; and Fig. 3 is a side elevation of the supporting device removed.

My invention has relation to pipe connections, such, for instance, as are used in heating systems employing pipes of relatively large diameters; and is designed to provide a connection which can readily be used, or adapted for use, in a variety of different locations, thereby reducing largely the pattern work required in the manufacture of fittings and connections for a system of such character.

The nature of my invention will be best understood by reference to the accompanying drawings, in which I have shown the preferred embodiments thereof, and which will now be described.

The drawings show my invention as applied to a straight two-way pipe connection, with expansion joints, but it will be readily understood from the following description that this is only one of a considerable number of uses to which the invention is adapted.

In the drawings, the numeral 2 designates a straight two-way pipe connection, which is formed with an integral supporting portion 3, and which has a bolting flange 4 at each end. 5 designates rings which are bolted to the flanges 4, and 6 are gland rings having flanges 7 seating against the packings 8, which packings are seated within the rings 5.

9 designates one of the line pipes, which has a bolting flange 10, which is connected by bolts 11 to a ring 12. This ring seats the flange end of a relatively short pipe section 13, which extends through the gland 6 and packing 8 into the end portion of the member 2.

Each of the rings 5 is formed with a plurality of longitudinally extending arms or fingers 14, which are arranged to form a semi-circular supporting cradle for the rings 12. The arms or fingers 14 are preferably united at their outer ends by a connecting member 15.

The pipe sections 13 are arranged to slide telescopically through the gland rings to take care of expansion and contraction, the rings 12 moving therewith and sliding on the support formed by the arms or fingers 14, thus forming a simple and effective expansion joint.

The bolt hole arrangement and spacing of the bolting flanges 4 of the member 2, is preferably the same as that of the bolting flange of the pipe 9. If an expansion joint is not desired at one end, or at either end of the member 2, the member or members 5 may be removed and the flanges of the pipe section or sections 9 bolted directly to the flange or flanges 4 of the member 2. In this manner the member 2 without any change in its construction will answer either as a simple anchor connection for the pipe sections 9, or as an expansion connection with either one or both of the said pipe sections.

The member 2 may be secured to a support in any desired position, either horizontally, vertically, or at an angle, and the supporting member 3 in any desired position, that is to say, instead of the member 2 being in the position in which the supporting portion 3 acts as a base, it may be inverted and the portion 3 secured in an overhead support; or the member 2 may be turned at any desired angle.

The member 2 instead of being a straight two-way connection, may obviously be a T, an elbow, or of any other desired form.

The advantages of my invention will be readily apparent to those familiar with this art, since it provides a practically universal pipe connecting member adapted for use in a large variety of locations.

What I claim is:—

1. A pipe connecting member having an end bolting flange, and a member adapted to be detachably connected to said flange and having a plurality of projecting portions forming a supporting cradle open at the top; substantially as described.

2. A pipe connection having an integral supporting portion and an end bolting flange, and a member adapted to be detachably bolted to said flange and formed with a plurality of longitudinally extending portions connected at their outer ends and forming a semicircular supporting cradle open at the top; substantially as described.

3. A pipe connecting member having an end bolting flange and a member adapted for detachable connection to said flange and having a projecting semicircular supporting cradle open at the top, said member also being provided with a packing seat; substantially as described.

4. A pipe connection comprising a flange member provided with bolt holes and having a plurality of separate longitudinally projecting arms or fingers, said arms or fingers being connected at their outer ends to form a semicircular pipe-supporting cradle which is open at the top; substantially as described.

In testimony whereof, I have hereunto set my hand.

EDWARD B. TYLER.

Witnesses:
H. M. CORWIN,
GEO. H. PARMELEE.